US011829259B2

(12) United States Patent
Singhal et al.

(10) Patent No.: US 11,829,259 B2
(45) Date of Patent: Nov. 28, 2023

(54) AUTOMATED CREATION OF VARIABLE DATA STORAGE ENVIRONMENTS FOR APPLICATION TESTING

(71) Applicant: EMC IP Holding Company LLC, Hopkinton, MA (US)

(72) Inventors: Upanshu Singhal, Bangalore (IN); Laharicharan Bejjanke, Warangal (IN); Sanjeev Kumar Lohchab, Bangalore (IN); Syed Razi Rasool, Bangalore (IN); Sowmya Devarahalli Nanjappa, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 176 days.

(21) Appl. No.: 16/891,332

(22) Filed: Jun. 3, 2020

(65) Prior Publication Data

US 2021/0382795 A1 Dec. 9, 2021

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1451* (2013.01); *G06F 11/1461* (2013.01); *G06F 11/1464* (2013.01); *G06F 2009/45595* (2013.01); *G06F 2201/80* (2013.01)

(58) Field of Classification Search
CPC ....... G06F 2009/45595; G06F 9/45558; G06F 11/1464; G06F 2201/80; G06F 11/1451; G06F 11/1461; G06F 11/1469; G06F 2201/815; G06F 11/3664; G06F 11/3688; G06F 11/1446; G06F 2009/45579; G06F 2009/45587
USPC .................................................. 711/162, 161
See application file for complete search history.

(56) References Cited

U.S. PATENT DOCUMENTS

| | | | | |
|---|---|---|---|---|
| 2006/0037002 | A1* | 2/2006 | Vinberg | G06F 8/65 717/124 |
| 2009/0288084 | A1* | 11/2009 | Astete | G06Q 30/0603 718/1 |
| 2010/0036698 | A1* | 2/2010 | Garrison | G06Q 20/20 705/16 |
| 2014/0068022 | A1* | 3/2014 | Kshirsagar | H04L 41/0813 709/220 |

(Continued)

*Primary Examiner* — David Yi
*Assistant Examiner* — Zubair Ahmed
(74) *Attorney, Agent, or Firm* — Dergosits & Noah LLP; Todd A. Noah (57) ABSTRACT

Described is a system for automated creation of various data storage environments for application testing. The system may provide an efficient mechanism for creating various computing environments employed by clients of a data protection and recovery service. For example, different clients may utilize different data storage infrastructure (e.g. servers, storage arrays, databases, etc.) on which common backup-related components are overlaid. The system may build different combinations of computing environments and perform application testing across such environments simultaneously (or in parallel) within a virtual environment. Accordingly, the system may verify the operational consistency of backup-related applications across a large sample of client computing environments in an efficient manner.

20 Claims, 4 Drawing Sheets

(56) References Cited

U.S. PATENT DOCUMENTS

2014/0143778 A1\* 5/2014 Gopal ................. G06F 9/45533
　　　　　　　　　　　　　　　　　　　　　　718/1
2017/0322827 A1\* 11/2017 Little .................. G06F 11/3428

\* cited by examiner

AUTOMATED CREATION OF VARIABLE DATA STORAGE ENVIRONMENTS FOR APPLICATION TESTING

TECHNICAL FIELD

This disclosure relates to creating data storage environments, and more particularly, automating the creation of various data storage environments for application testing.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As part of such services, providers may support a wide range of products for managing indispensable data. To support such products, providers may periodically release new or upgraded backup-related applications to clients. Accordingly, as part of the development process, providers must perform rigorous testing to ensure vital processes and data are maintained when implementing deploying such applications into existing client production environments. However, different clients may implement a wide range of computing environments that include various data storage configurations spanning multiple types of physical and cloud-based infrastructure. As a result, testing applications that account for such variable client environments becomes increasingly challenging. Thus, there is a continued need for tools that efficiently manage testing processes for backup-related applications implemented within various computing environments.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for automated creation of various data storage environments for application testing. For example, the system may provide an efficient mechanism for creating various computing environments employed by clients of a data protection and recovery service. For instance, different clients may utilize different data storage infrastructure on which common backup-related products are overlaid. Accordingly, in some embodiments, the system provides the ability to create (or build) various combinations of such data storage infrastructure in an automated manner. In addition, the system may automate the testing of applications within such storage environments. For example, the system may build different combinations of computing environments and perform testing across such environments simultaneously (or in parallel) within a virtual environment in an automated manner. Accordingly, the system may verify the operational consistency of applications across a large sample of client computing environments in an effective and efficient manner.

To provide such a capability, the system may utilize specialized components such as an environment creation manager (or automation manager). The environment creation manager (ECM) may automate the process of leveraging virtual machines (VMs) to create various computing (or data storage) environments. For example, the ECM may determine various combinations of data storage environments employed by clients, and create such environments within one or more VMs for testing purposes. For instance, the created environments may simulate (e.g. via virtualization) various combinations of data storage components such as servers, storage arrays, databases, etc. that may be implemented as part of a client data storage environment on which a data protection and recovery service (or products) are overlaid. To create such environments, the system may automate a specialized process that includes, for example, creating certain types of VMs, configuring a network for the VMs, creating storage resources, and installing database and backup applications on the VMs. The system may then perform various tests associated with the backup application within such VMs to verify functioning of the backup application within corresponding client environments. If necessary, the system may also perform any addition analysis or debugging within the VM for any issues that are detected in response to the testing. Otherwise, if the verification testing associated within a particular environment is successful, the system may destroy (or tear down) the corresponding VM and create a new VM to perform testing for an environment having a different combination of data storage components. The process may then be repeated as necessary to test any number of potential client data storage environments. Accordingly, in some embodiments, the system provides the ability to efficiently test a multitude of variable data storage configurations that may be associated with deploying a backup application within client production environments as part of providing a data protection and recovery service.

In some embodiments, such a system may be provided within an operating environment. An example of such an operating environment is further described herein with reference to FIG. 1. However, in general, the operating environment may take the form of a cloud-based environment, on-premises environment, hybrid environments that include public and private elements, or any other type of environment. In addition, any of these environments may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique (e.g. file-based, block-based, object-based storage, etc.), infrastructure (e.g. cloud-based), or hardware (e.g. Solid State Drive (SSD), Hard Disk Drive (HDD), etc.).

Figure 1:
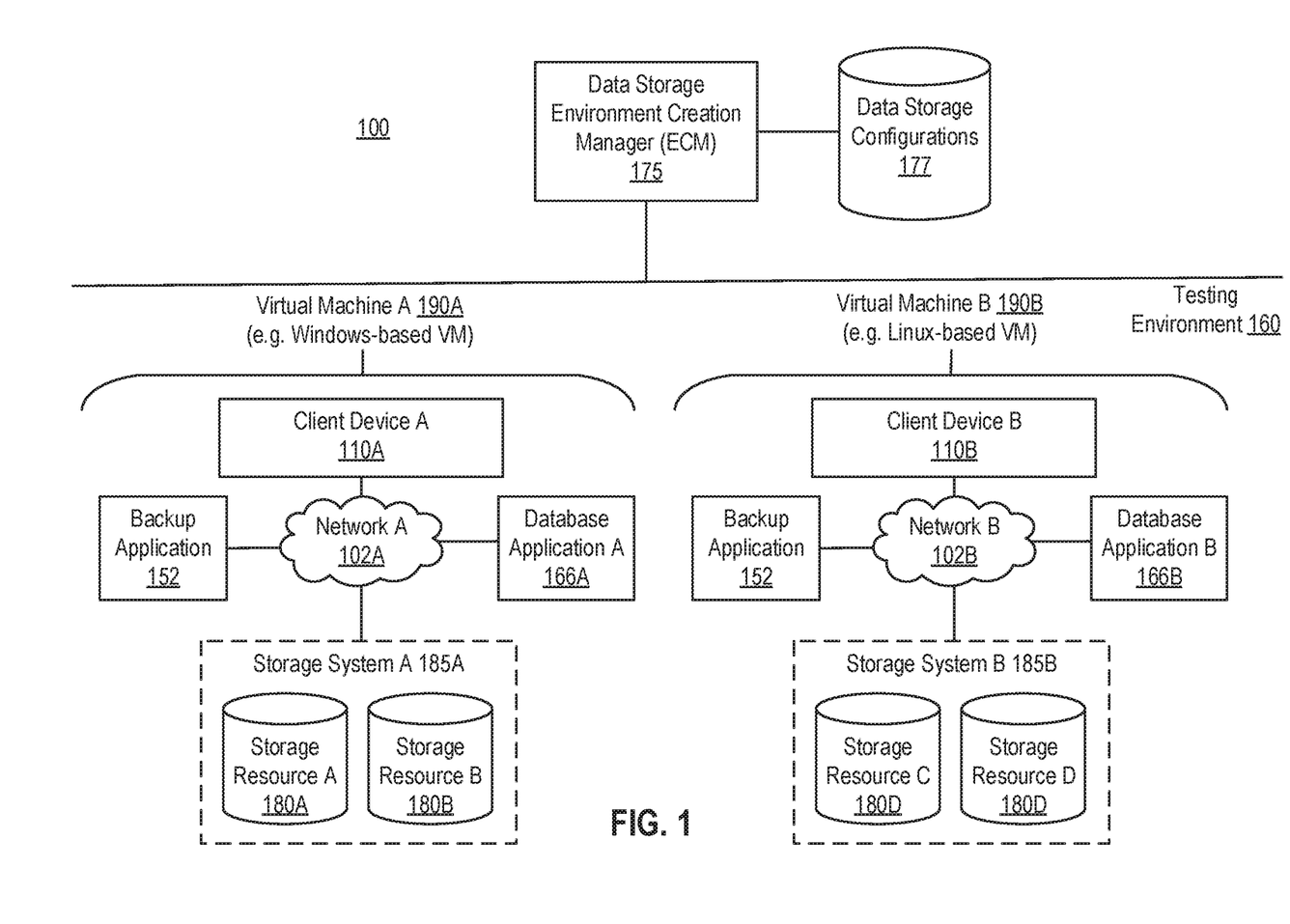
FIG. 1 is a block diagram illustrating an example operating environment for automated creation of various data storage environments according to one or more embodiments of the disclosure.

Referring now to FIG. 1, shown is a block diagram illustrating an example operating environment 100 for automated creation of various data storage environments according to one or more embodiments of the disclosure.

As shown, the operating environment 100 may include a data storage environment creation manager (ECM) 175 that may access data storage configurations 177 to create computing environments within a testing environment 160. These components may interact via a network, which may be any type of wired or wireless network including a local area network (LAN), a wide area network (WAN), a direct communication link, or other suitable connection.

The data storage environment creation manager (ECM) 175 may coordinate (or manage, orchestrate, execute, automate, etc.) various operations (or processes, methods, etc.) for the automated creation and testing of data storage environments as further described herein. In some embodiments, the ECM 175 may provide an interface that allows a user to perform various operations such as inputting data storage configurations 177 (e.g. as an input file, or user selections). In some embodiments, the ECM 175 may be part of (or work in conjunction with) the testing environment 160. Accordingly, the ECM 175 may direct (or control, initiate, etc.) other components (e.g. VM 190) of the testing environment 160 to perform various operations.

In general, the testing environment 160 may include components to simulate one or more computing environments (or data storage environments) specified by the data storage configurations 177. For example, the data storage configurations 177 may represent computing environments implemented (or potentially implemented) by clients associated with a backup application or service. For example, a client may include a customer, tenant, user, account, entity, etc., that may subscribe to, or otherwise implement, a data protection and recovery service or product. For example, at least some functionality of the data protection and recovery service may be provided by, or implemented in connection with, various platforms such as the Data Domain™ data protection platform provided by Dell EMC™ Corporation (Dell EMC), although any suitable platforms or products are contemplated.

As shown, the testing environment 160 may include one or more virtual machines (VMs) 190. In some embodiments, each VM 190 may be used to simulate a particular computing (or data storage) environment (or configuration). As shown, a VM 190 may include a client device (or computer, system, etc.) 110, storage system 185, database application 166, and backup application 152, all of which may interact via a network 102. The network 102 may be any type of wired or wireless network including a local area network (LAN), a wide area network (WAN), or a direct communication link, or other suitable connection. In some embodiments, the network 102 may be configured as a dedicated network or subnetwork that interconnects and presents a shared pool of storage resources. For example, network 102 may be a storage area network (SAN).

The client device 110 may be a source of, or associated with, data to be backed up. In some embodiments, the client device 110 may act as a host (or host device). The data may be any type of data including data stored as part of a database. The database may be part of a database system (or management system) that includes a database application 166 that manages the storage of data within the database.

The backup application 152 may be a component that performs (or manages, coordinates, etc.) the creation and recovery (or restoration) of data as part of a data protection service. For example, data stored within a database may be communicated from the client device 110 to the backup application 152 for storage within the storage system 185. In addition, in some embodiments, data within the storage system 185 may also be the source of data to be backed-up. In some embodiments, the backup application 152 may cooperate with a backup client application of the client device 110 or storage system 185 to back up data. In some embodiments, the backup application 152 may be a part of, or work in conjunction with, addition backup components (not shown). These backup components may include a backup appliance and backup server. For example, the backup (or storage) appliance may include a Dell EMC CloudBoost appliance (although any suitable appliance is contemplated). Similarly, the backup server may be implemented in conjunction with a Data Domain deduplication storage server provided by Dell EMC for use with Data Domain™ Restorer (DDR) storage devices. For example, the backup server may include a Dell EMC Avamar server ("Avamar"), a Dell EMC Networker server ("Networker") or a PowerProtect Data Manager server ("PPDM") (although any suitable type server is contemplated). It should be noted that the backup application 152 and related backup components may be implemented in various forms, such as a virtual, physical, or native public cloud appliance based on particular configurations, and the backup application 152 may be used with various types of data protection environments, including public and private object storage clouds.

As shown, each VM 190 may include, or be associated with, a storage system 185 that is configured to store backups of data within one or more storage resources 180. For example, the backups of data stored by the storage resources 180 may be restored to the client device 110 (or database) as part of a recovery process. In some embodiments, a storage system 185 may include one or more instances of a filesystem that catalogues files and other data residing within the corresponding storage resources 180. It should be noted that the storage system 185 may be implemented using any suitable type of storage resources (or storage platform). In some embodiments, a storage resource 180 may include one or more logical unit numbers (LUNs). For example, a LUN may be a logical unit of block storage that may be created as part of a storage pool. In addition, LUNs may be organized into consistency group so operations on a consistency group affect all the LUNs contained in the group. As a result, a consistency group provides recovery consistency if one or more LUNs are dependent upon each other. In some embodiments, one or more storage resources 180 may be a secondary (or recovery) storage resource (e.g. storage resource B 180B) that is configured to provide replication (or recovery, mirroring, etc.) capabilities for a corresponding primary storage resource (e.g. storage resource A 180A).

In some embodiments, each VM 190 (e.g. VMs 190A, and 190B) may virtually represent (or simulate) a different configuration of a computing (or data storage) environment implemented by a client of a data protection and recovery service. For example, a configuration of a computing environment may differ with respect to various components such as an operating system (OS) implemented within the environment (e.g. Windows, Linux, AIX, etc.), types of servers (e.g. server brand, type, model, etc.), network type or configuration (e.g. SAN, NAS, etc.), types of storage architecture (e.g. file-based, or object-based), types of storage arrays, storage hardware type (e.g. HDD, SSD, etc.), types of databases (e.g. Oracle, SQL Server, DB2) and related database applications, and type of backup application that may be implemented as part of the data protection and recovery service (e.g. NetWorker, Avamar, PPDM, etc.), as well as any other components that may be part of, or associated with, a data storage environment.

For instance, in this example, VM A 190A may implement a first operating system (e.g. Windows OS), may use a first configuration for its network A 102A, implement a first type of database application (e.g. Oracle) for its database application A 166A, and implement one or more first types of architecture, storage array, server, etc., for its storage system A 185A that include storage resources 180A and 180B. Whereas, VM B 190B may implement a second operating system (e.g. Linux-based OS), may use a second configuration for its network B 102B, implement a second type of database application (e.g. DB2) for its database application B 166B, and implement one or more second types of architecture, storage array, server, etc., for its storage system B 185B that include storage resources 180C and 180D.

In some embodiments, the backup application 152 may be the same (e.g. same instance) in each of VMs 190A and 190B. For example, a particularly version of a backup application (e.g. Networker version) may be tested in various types of data storage configurations. However, in some embodiments, the backup application (or instance thereof) may differ. For example, a first version of backup application may be tested in VM A 190A, and a second version of the backup application may be tested in VM B 190B.

Accordingly, in some embodiments, the ECM 175 may perform a specialized process to automate the creation of VMs 190 and perform testing of components associated with the VM 190 (e.g. backup application 152) as further described with reference to FIG. 2.

Figure 2:
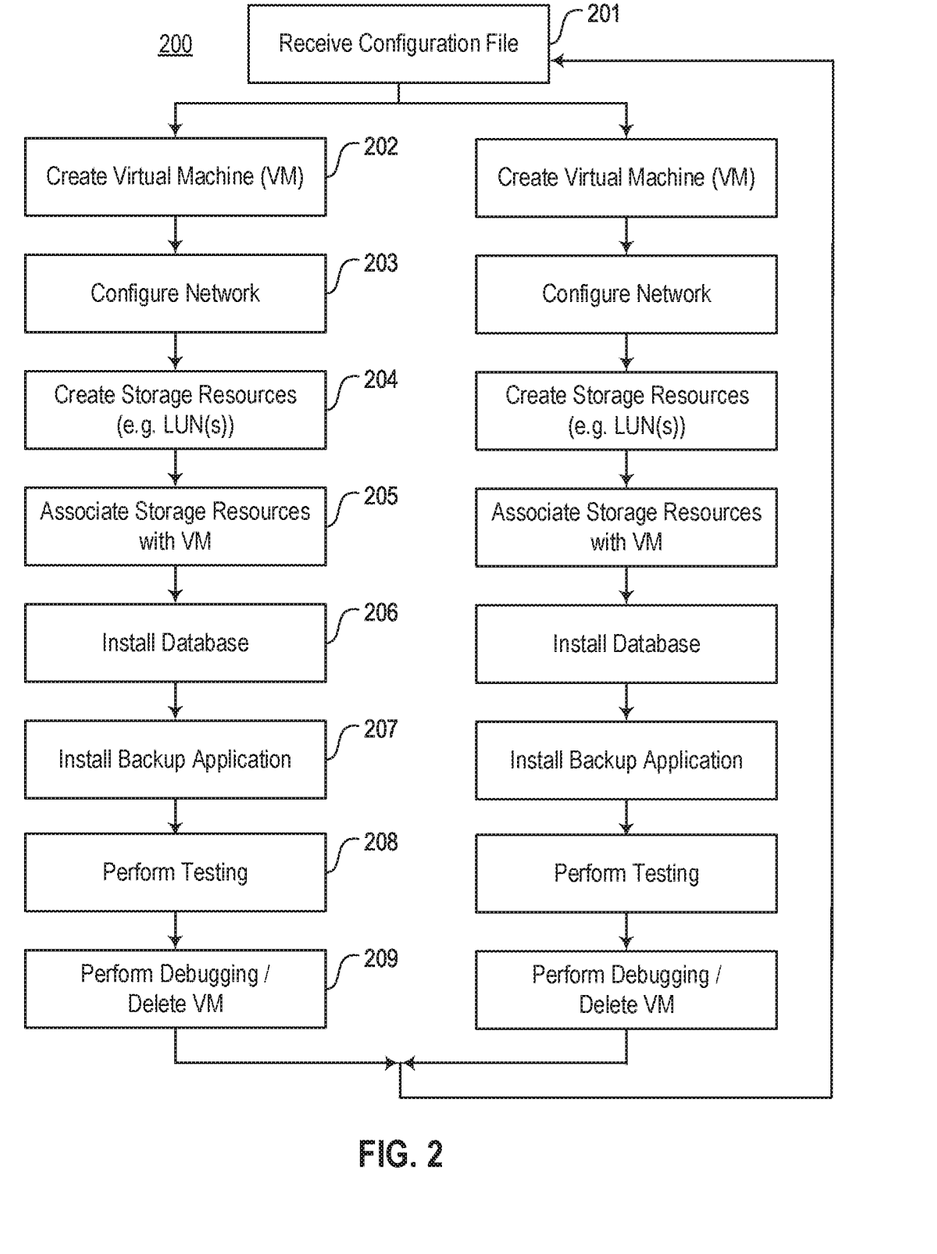
FIG. 2 is a process flow diagram illustrating an example process for creating a plurality of data storage environments for testing according to one or more embodiments of the disclosure.

FIG. 2 is a process flow diagram 200 illustrating an example process for creating a plurality of data storage environments for testing according to one or more embodiments of the disclosure. Process 200 may use processing logic, which may include software, hardware, or a combination thereof. For example, process 200 may be performed by a system including one or more components described in operating environment 100.

In 201, the system may receive a configuration file that specifies various data storage configurations (e.g. data storage configurations 177). The configuration file may include, or be created from, any suitable data store (e.g. database, structured document, etc.). In some embodiments, the configuration file may be received as input into a user interface. For example, a user may input a configuration file for testing, or the configuration file may be created by user input/selections. For instance, a user may select certain components (e.g. type of OS, database, storage array, etc.) of an environment for testing, via an interface (e.g. of the ECM 175), to create such a configuration file.

In response to receiving the configuration file, the system may perform an automated process to create and perform testing of various data storage configurations. As shown, the system may perform such creation and testing of multiple configurations in parallel. For example, operations 202-209 may be performed in parallel for multiple VMs. In addition, operations 202-209 may be performed independently. For example, each of the operations may be initiated (or executed) using a service endpoint available to the system.

To perform such an automated process, the system may first create one or more VMs that each represent a computing (or data storage) environment with a particular data storage configuration. Accordingly, in 202, the system may create (or deploy, initialize, instantiate, etc.) a set of VMs. In some embodiments, a VM may be created for a computing environment implementing (or utilizing) a particular operating environment. It should be noted that although certain operating systems (e.g. Windows, Linux, AIX, etc.) are given as examples, any other types of operating systems (or platforms, kernels, etc.) are contemplated such that a corresponding VM (or hypervisor) may be created.

In 203, once the VMs are created and/or deployed, the system may configure a network for each of the VMs. In some embodiments, the system may configure a storage area network (SAN) for one or more of the VMs. Configuring a network may include specifying any settings that may be associated with configuring a network (e.g. addresses, permissions, servers, hosts, etc.). In addition, configuring the network may also include configuring any related components. For example, the system may configure a domain name server (DNS) as part of the network configuration.

In 204, the system may create and configure a set of storage resources for each of the VMs. In some embodiments, the storage resource may include a LUN. For example, the storage resources (e.g. LUNs) may store data (e.g. as part of a database) that may subject to a data protection and recovery policy.

In 205, the system may associate the storage resources with the VM (or component thereof). For example, the system may associate one or more LUNs with the VM. In some embodiments, associating the LUNs with the VM may include performing a masking and/or zoning. For example, the system may perform a masking (or LUN masking) to authorize a host (e.g. VM, or component thereof) to access particular LUNs by making those LUNs available to the VM. In addition, the system may also perform a zoning that associates the one or more LUNs with the VM. As part of the process to associate storage resources with the VM, the system may also perform a mapping. For example, the system may perform a raw disk mapping (RDM) that presents one or more LUNs directly to the VM from the network (e.g. SAN) instead of, for example, creating a virtual disk (VMDK) on the LUN.

In 206, the system may install a database (or database application or component) on the VM. For example, a client may store data within a particular type of database, and accordingly, the system may install a corresponding database application.

In 207, once the framework of the data storage environment has been initialized, the system may install (e.g. overlay) a backup application (or data protection application) on the VM. For example, the system may install a particular backup application that may be subjected to various tests to ensure the functionality of the application within the particular data storage configuration of the VM.

In 208, the system may perform testing within the initialized data storage environment created on the VM. For example, the testing may include various operations that verify the functionality of the backup application interacting with a particular data storage configuration of the VM. For example, the testing may include verifying functionality such as the execution of a particular backup policy, the creation of backup data, storing backup data to particular storage resources, the performance of particular storage resources, recovering (or restoring) data from a backup, and any other backup-related operations.

In 209, the system may perform debugging or delete the VM based on the outcome of the testing. For example, if issues are detected during the testing such as errors, data loss, poor performance, etc., the system may retain the VM to perform additional analysis and debugging within the particular data storage environment. However, if no issues are detected during the testing, the system may delete the particular VM to clear resources for the next round of testing that may be performed by creating a new VM.

Figure 3:
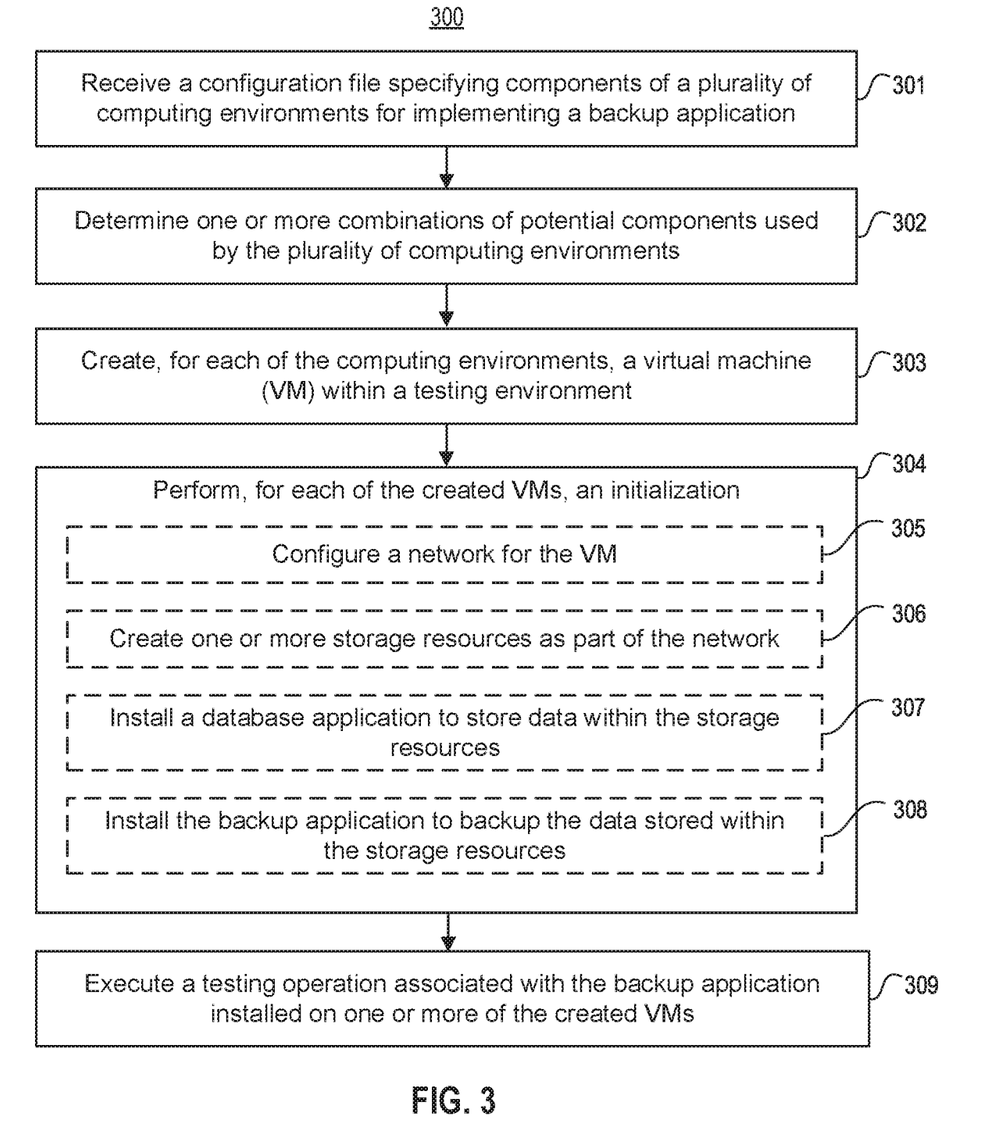
FIG. 3 is a flow diagram illustrating an example method of automated creation and testing of data storage environments according to one or more embodiments of the disclosure.

FIG. 3 is a flow diagram 300 illustrating an example method of automated creation and testing of data storage environments according to one or more embodiments of the disclosure. Process 300 may use processing logic, which may include software, hardware, or a combination thereof. For example, process 300 may be performed by a system including one or more components described in operating environment 100.

In 301, the system (e.g. ECM 175) may receive a configuration file (e.g. client environment configurations 177) specifying components of a plurality of computing environments for implementing a backup application (e.g. backup application 152). In some embodiments, the plurality of computing environments may include at least a first computing environment using a first operating system, and a second computing environment using a second operating system.

In some embodiments, based on the components included in the configuration file, the system may perform an operation to identify various combinations of components that a client may implement in their production environments. The system may then create and test such combinations as part of the automated process.

For example, in 302, the system may determine, based on the components specified in the configuration file, one or more combinations of potential components (e.g. data storage components) used by each of the first and second computing environments. In some embodiments, the system may determine the one or more combinations of potential components in response to receiving the configuration file. The system may then select, amongst the determined combinations, a first combination of components for a first VM (e.g. VM A 190A), and a second combination of components for a second VM (e.g. VM B 190B).

In 303, the system may create, for each of the computing environments, a virtual machine (VM) within a testing environment. In some embodiments, the created VMs may include at least a first VM (e.g. VM A 190A) for the first operating system (e.g. Windows OS) corresponding to the first computing environment, and a second VM (e.g. VM B 190B) for the second operating system (e.g. Linux OS) corresponding to the second computing environment.

In 304, the system may perform, for each of the created VMs, an initialization. For example, the initialization may be performed for each of the first VM and second VM.

In some embodiments, the system may create, initialize, and performing testing within one or more VMs in a substantially parallel (or concurrent, simultaneous, etc.) manner. For example, the system may initiate a first process (or thread) to create the first VM, initialize the first VM, and perform testing within the first VM, and at substantially the same time (e.g. in parallel) initiate a second process (or thread) to create the second VM, initialize the second VM, and perform testing within the second VM.

In some embodiments, the initialization may include one or more sub-processes (e.g. operations 305-308). In some embodiments, each of these sub-processes (or steps, operations, functions, etc.) may be performed (or executed) using an independent (or distinct) service endpoint (or application programming interface (API) operation). As described, the initialization of the second VM may occur substantially in parallel with the initialization of the first VM.

More specifically, in 305, the system may configure a network for the VM for each of the created VMs (e.g. at least the first and second VMs). In some embodiments, the network may include a SAN. The configuration may include specifying one or more network settings to configure (or create) a network. For example, the network settings may include configuring a domain name server (DNS) for identifying components associated with the VM (e.g. storage servers, hosts, etc.). The network settings may also include specifying addresses (e.g. IP addresses) or other forms of identifiers (e.g. names) for components associated with the VM (e.g. accessible via the network).

In 306, for each of the created VMs, the system may create one or more storage resources as part of the network. In some embodiments, each of the created storage resources may be a LUN.

In some embodiments, the initialization may further include the system performing a masking that authorizes the VM to access the created LUNs, In addition, the system may performing a raw disk mapping (RDM) that presents each of the created LUNs directly to the VM from the network. Once the RDM is completed, the system may also create a file system on the VM.

In 307, for each of the created VMs, the system may install a database application to store data within the storage resources. For example, a database application may be specific to the type of database system to be tested. For example, a first type of database application (e.g. database application A 166A) may be installed on the first VM (e.g. VM A 190A) to correspond to a first type of database (e.g. Oracle). Whereas, a second type of database application (e.g. database application B 166B) may be installed on the second VM (e.g. VM B 190B) to correspond to a second type of database (e.g. DB2).

In 308, for each of the created VMs, the system may install the backup application to backup the data stored within the storage resources. In some embodiments, the same backup application (or version) may be installed on each of the VMs. However, in some embodiments, different backup applications (or versions) may be installed on the different VMs.

In 309, the system may execute a testing operation associated with the backup application installed on one or more of the created VMs. In some embodiments, the system may perform the same (or substantially similar) tests on each of the backup application instances installed on the created VMs (e.g. first and second VMs). However, the system may also perform configuration-specific tests associated with the backup application installed on each VM. In some embodiments, a testing operation may include various operations that verify the functionality of the backup application interacting with a particular data storage configuration of the VM. For example, the testing may include verifying functionality such as the execution of a particular backup policy, the creation of backup data, storing backup data to particular storage resources, the performance of particular storage resources, and recovering (or restoring) data from a backup.

If the system determines the one or more testing operations are unsuccessful (e.g. by identifying issues such as errors, low performance, data loss, etc.), the system may retain the particular VM, and thus, the particular data storage configuration to perform additional analysis or debugging. Otherwise, if the system determines the testing operations are successful, the system may delete (or tear down, destroy, dismantle, etc.) the particular VM to clear (or make available) corresponding resources to create a new VM and perform testing within a different data storage configuration. Accordingly, the system may repeat the above operations in a continuous and automated manner to perform testing within any number of data storage configurations.

As described, in some embodiments, the automated process may perform various operations independently using service endpoints. For example, creating the virtual machine (VM) may include the system accessing, from the testing environment, a first service endpoint that initiates the creation of the VM. Similarly, performing the initialization may include the system accessing, from the testing environment, a set of independent service endpoints to perform initialization operations independently. For example, the system may access a second service endpoint that configures the network, a third service endpoint that initiates the creation of the one or more storage resources, a fourth service endpoint that installs the database application, and a fifth service endpoint that installs the backup application. In addition, performing the testing may also include the system accessing, from the testing environment, another set of independent service endpoints to perform various testing operations independently. For example, the system may access a sixth service endpoint to execute one or more a testing operations associated with the backup application.

Accordingly, in some embodiments, the method provides the ability to efficiently test a multitude of data storage configurations that may be associated with deploying a backup application within client production environments as part of providing a data protection and recovery service.

Figure 4:
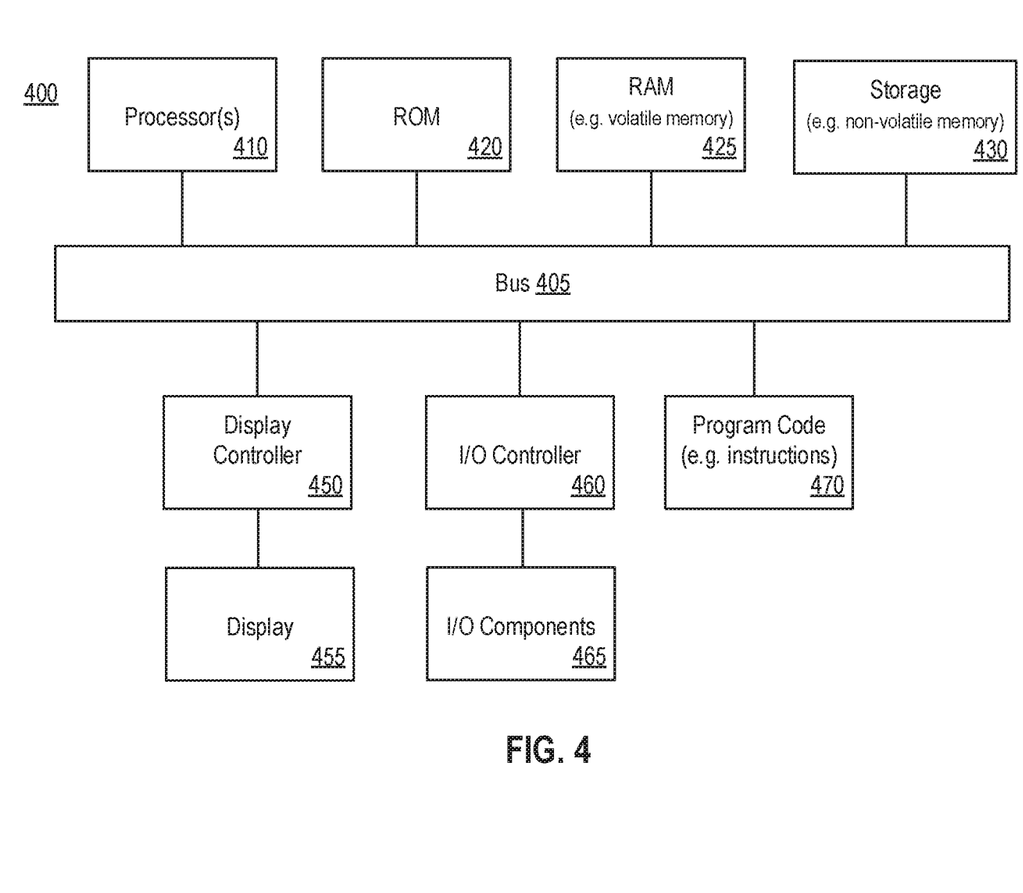
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. ECM 175, VM 190, environment 160) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. ECM 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive a configuration file, the configuration file specifying components of a plurality of computing environments, the plurality of computing environments including at least a first computing environment using a first operating system and a second computing environment using a second operating system;
determine, for each of the first and second computing environments, one of a first and second combination of components specified in the configuration file that are potentially used by the first and second computing environments to implement first and second backup applications;
create, for each of the computing environments, a corresponding virtual machine (VM) within a testing environment, the created VMs including at least a first VM for the first operating system in the first computing environment, and a second VM for the second operating system in the second computing environment;
perform, for each of the created VMs, an initialization including:
configuring a network for one of the first and second VMs;
creating one or more storage resources within the one of the first and second VMs that are accessible by other components within the one of the first and second VMs via the network for the one of the first and second VMs;
installing a database application to store data received over the network for the one of the first and second VMs within the storage resources; and
installing the first and second backup applications to back up the data stored within the storage resources, wherein each of the network, the storage resources, the database application, and the first and second backup applications being initialized using a determined combination of components from the configuration file corresponding to the first and second computing environments associated with the first and second VMs; and
execute at least one testing operation associated with the first and second backup applications installed on the created VMs.

2. The system of claim 1, wherein the initialization of the second VM occurs substantially in parallel with the initialization of the first VM.

3. The system of claim 1, wherein: each of the created storage resources comprises a logical unit number (LUN); and performing the initialization further includes:
performing a masking that authorizes at least one of the first and second VMs to access the created LUNs; and
performing a raw disk mapping (RDM) that presents each of the created LUNs directly to at least one of the first and second VMs from the network.

4. The system of claim 1, wherein the plurality of instructions, when executed, further cause the one or more processors to: select, amongst the determined combinations, a first combination of components for the first VM, and a second combination of components for the second VM to perform initializations of the first VM and the second VM.

5. The system of claim 1, wherein creating at least one of the first and second virtual machines (VM) includes accessing, from the testing environment, a first service endpoint that initiates the creation of at least one of the first and second VMs.

6. The system of claim 1, wherein performing the initialization includes accessing, from the testing environment, a set of independent service endpoints including:
   a second service endpoint that configures the network; and
   a third service endpoint that initiates the creation of the one or more storage resources.

7. The system of claim 6, wherein accessing the set of independent service endpoints further includes:
   a fourth service endpoint that installs the database application; and
   a fifth service endpoint that installs at least one of the first and second backup applications.

8. The system of claim 1, wherein performing the initialization further includes creating a file system on at least one of the first and second VMs.

9. A method comprising:
   receiving a configuration file, the configuration file specifying components of a plurality of computing environments for implementing a first backup application and a second backup application, the plurality of computing environments including at least a first computing environment using a first operating system and a second computing environment using a second operating system;
   determining, for each of the first and second computing environments, at least one combination of components specified in the configuration file that are potentially used by the first and second computing environments to implement the first and second backup applications;
   creating, for each of the computing environments, first and second virtual machines (VM) within a testing environment, the created VMs including the first VM for the first operating system, and the second VM for the second operating system;
   performing, for each of the created VMs, an initialization including:
      configuring a network for one of the first and second VMs;
      creating one or more storage resources within the one of the first and second VMs that are accessible by other components within the one of the first and second VMs via the network for the one of the first and second VMs;
      installing a database application to store data received over the network for the one of the first and second VMs within the storage resources; and
      installing the first and second backup applications to back up the data stored within the storage resources, wherein each of the network, the storage resources, the database application, and the first and second backup applications being initialized using a determined combination of components from the configuration file corresponding to the first and second computing environments associated with the first and second VMs; and
   executing at least one testing operation associated with the first and second backup applications installed on the created VMs.

10. The method of claim 9, wherein the initialization of the second VM occurs substantially in parallel with the initialization of the first VM.

11. The method of claim 9, wherein:
    each of the created storage resources comprises a logical unit number (LUN); and
    performing the initialization further includes:
       performing a masking that authorizes at least one of the first and second VMs to access the created LUNs; and
       performing a raw disk mapping (RDM) that presents each of the created LUNs directly to at least one of the first and second VMs from the network.

12. The method of claim 9, further comprising: selecting, amongst the determined combinations, a first combination of components for the first VM, and a second combination of components for the second VM to perform initializations of the first VM and the second VM.

13. The method of claim 9, wherein creating at least one of the first and second virtual machines (VM) includes accessing, from the testing environment, a first service endpoint that initiates the creation of at least one of the first and second VMs.

14. The method of claim 9, wherein performing the initialization includes accessing, from the testing environment, a set of independent service endpoints including:
    a second service endpoint that configures the network;
    a third service endpoint that initiates the creation of the one or more storage resources;
    a fourth service endpoint that installs the database application; and
    a fifth service endpoint that installs at least one of the first and second backup applications.

15. A computer program product comprising a non-transitory computer-readable medium having a computer-readable program code embodied therein to be executed by one or more processors, the program code including instructions to:
    receive a configuration file, the configuration file specifying components of a plurality of computing environments for implementing first and second backup applications, the plurality of computing environments including at least a first computing environment using a first operating system and a second computing environment using a second operating system;
    determine, for each of the first and second computing environments, at least one combination of components specified in the configuration file that are potentially used by the first and second computing environments to implement the first and second backup applications;
    create, for each of the computing environments, one of first and second virtual machines (VM) within a testing environment, the created VMs including the first VM for the first operating system, and the second VM for the second operating system;
    perform, for each of the created VMs, an initialization including:
       configuring a network for one of the first and second VMs;
       creating one or more storage resources within the one of the first and second VMs that are accessible by other components within the one of the first and second VMs via the network for the one of the first and second VMs;
       installing a database application to store data received over the network for the one of the first and second VMs within the storage resources; and installing the first and second backup applications to back up the data stored within the storage resources, wherein each of the network, the storage resources, the database application, and the first and second backup applications being initialized using a determined combination of components from the configuration file corresponding to the computing environments associated with the first and second VMs; and execute at least one testing operation associated with the first and second backup applications installed on the created VMs.

16. The computer program product of claim 15, wherein the initialization of the second VM occurs substantially in parallel with the initialization of the first VM.

17. The computer program product of claim 15, wherein:
each of the created storage resources comprises a logical unit number (LUN); and
performing the initialization further includes:
    performing a masking that authorizes at least one of the first and second VMs to access the created LUNs; and
    performing a raw disk mapping (RDM) that presents each of the created LUNs directly to at least one of the first and second VMs from the network.

18. The computer program product of claim 15, wherein the program code includes further instructions to: select, amongst the determined combinations, a first combination of components for the first VM, and a second combination of components for the second VM to perform initializations of the first VM and the second VM.

19. The computer program product of claim 15, wherein creating at least one of the first and second virtual machines (VM) includes accessing, from the testing environment, a first service endpoint that initiates the creation of at least one of the first and second VMs.

20. The computer program product of claim 15, wherein performing the initialization includes accessing, from the testing environment, a set of independent service endpoints including:
    a second service endpoint that configures the network;
    a third service endpoint that initiates the creation of the one or more storage resources;
    a fourth service endpoint that installs the database application; and
    a fifth service endpoint that installs at least one of the first and second backup applications.

* * * * *